Patented Apr. 19, 1949

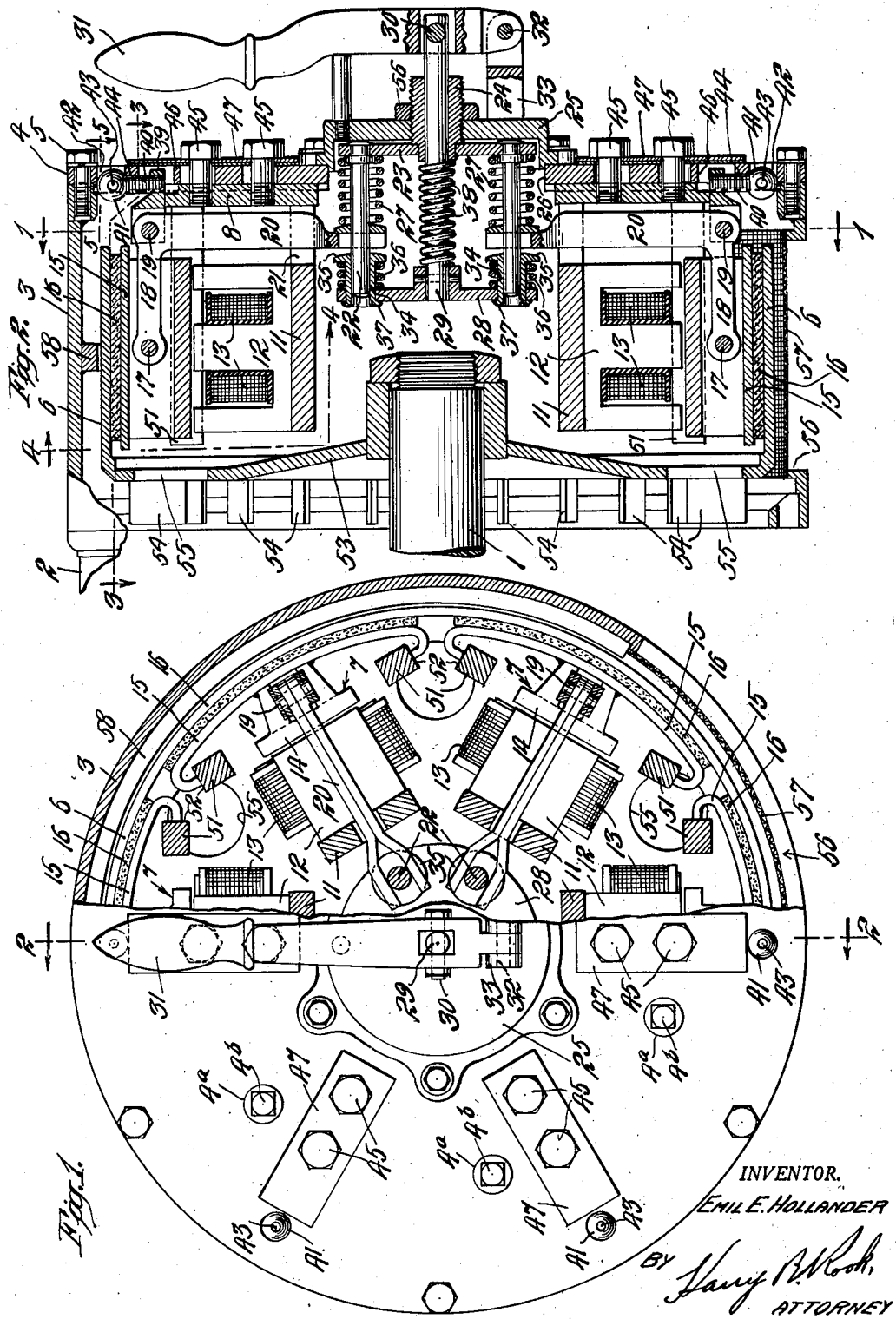

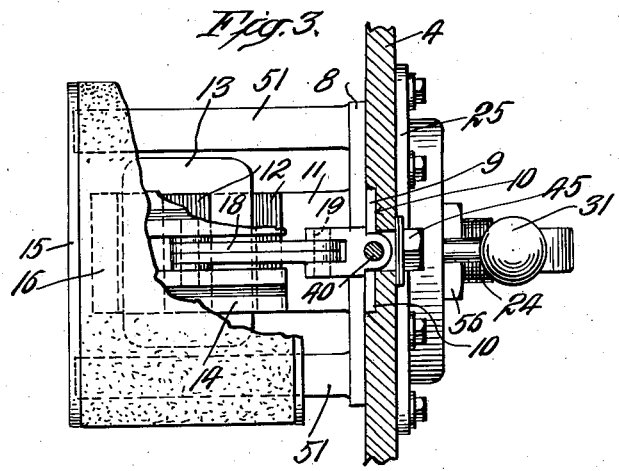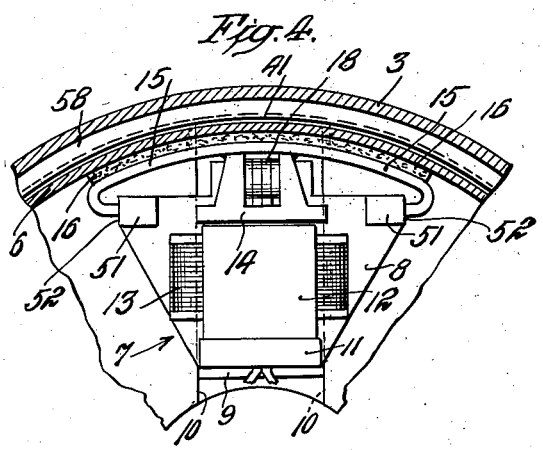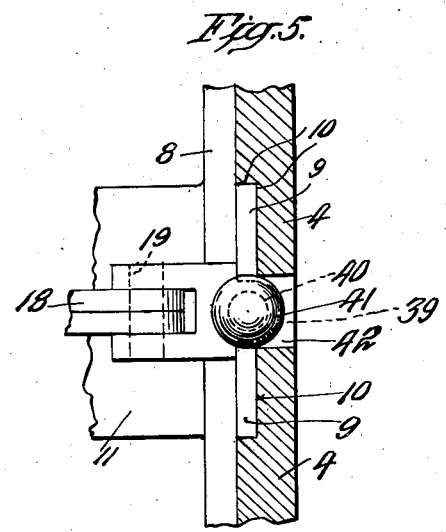

2,467,891

UNITED STATES PATENT OFFICE 2,467,891

ELECTROMAGNETIC BRAKE

Emil E. Hollander, Kearny, N. J., assignor to Star Electric Motor Company, Bloomfield, N. J., a corporation of New Jersey Application July 20, 1944, Serial No. 545,879

21 Claims. (Cl. 188—171)

This invention relates in general to brakes and particularly to brakes for the shafts of electric motors. More specifically the invention contemplates a brake of the type comprising a drum connected to the shaft to be braked and shoes normally actuated into frictional contact with said drum by springs and disengaged or released from the drum by electromagnets.

One object of the present invention is to provide a brake of the character described which shall embody novel and improved features of construction such that the brake shall be compact and shall operate substantially noiselessly without jarring or chattering of the parts. Such a brake is especially necessary in war-time in submarines where space is at a premium and even slight noises in the vessel can be easily detected by the extremely sensitive devices on enemy ships.

A second object is to provide for such a brake a plurality of separate brake-shoe units which can be handled and mounted individually on a support in proper relation to a brake drum, each comprising a bracket, an electromagnet mounted on said bracket and having a coil winding or solenoid thereon, and an armature carrying a brake-shoe, and a lever on which said armature is mounted and by which it is movable to actuate said brake-shoe into and out of engagement with a brake drum.

Another object is to provide in a brake of this character, the combination with a brake drum and a casing or support, of a plurality of such separate brake-shoe units of the character described each of which shall comprise a novel and improved construction and combination of a bracket, a core and a coil or winding of an electromagnet fixedly mounted on said bracket, an armature carrying a brake-shoe and actuated to move said shoe into and out of engagement with said drum by springs and electromagnetic force respectively, and means for mounting said units on said casing or support to vary the distance between said brake-shoes and said drum, for example to compensate for wear of the braking surfaces.

Further objects are to provide a novel and improved construction and combination of said armature, said brake-shoe and said magnet core such that said armature shall seat firmly and squarely on said core to restrain all tendency of said armature and brake-shoe to wobble while the latter is disengaged from the brake drum; and to provide novel and improved means for guiding and holding said brake-shoe against tilting or chattering during engagement thereof with said brake drum.

Still further objects are to provide novel and improved means for manually actuating said brake-shoes simultaneously out of engagement with said brake drum independently of said electromagnets, for example for testing the brake or in case of failure of said electromagnets; and to provide new, simple and reliable means for easily, quickly, simultaneously and uniformly adjusting the springs that actuate said brake-shoes so as to increase or decrease the torque developed by the brake.

Other objects are to provide in a brake of the character described novel and improved, simple means for cooling the electromagnetic cores and coils and the brake shoes and brake drum; and to obtain other advantages and results that will be brought out by the following description in conjunction with the accompanying drawings in which Figure 1 is a front elevational view of an electromagnetic brake embodying my invention, showing portions thereof broken away on the line 1—1 of Figure 2.

Figure 2 is a vertical longitudinal sectional view on the line 2—2 of Figure 1.

Figure 3 is a fragmentary horizontal sectional view on the line 3—3 of Figure 2.

Figure 4 is a fragmentary rear elevational view of one of the brake-shoe units viewed from the line 4—4 of Figure 2, and Figure 5 is a fragmentary horizontal sectional view on the line 5—5 of Figure 2, on an enlarged scale.

Specifically describing the illustrated embodiment of the invention, the reference character 1 designates the shaft to be braked, which in the present instance is the shaft of an electric motor that includes a housing, a portion of which is schematically illustrated and designated by the numeral 2.

The electromagnetic brake embodying my invention includes an approximately cylindrical hollow casing 3, one end of which is open and is secured in any suitable manner to the housing 2 of the motor. The other end of the casing 3 is closed by a face plate 4 that is separably secured to the casing by bolts 5. Arranged within the casing and coaxially therewith is a brake drum 6 which is rigidly connected to the shaft 1 to rotate therewith, and mounted on the inner side of the face plate 4 of the casing 3 is a plurality of separate and independent brake shoe units 7 having brake shoes to cooperate with the inner surface of the brake drum 6.

As shown, each unit 7 comprises an approximately L-shaped bracket one arm 8 of which has a rib 9 on its outer surface slidably mounted in a groove 10 on the inner side of the face plate 4 and extending radially thereof for the purpose of adjusting the brake-shoes relatively to the brake drum as hereinafter described. The other arm 11 of said bracket has mounted thereon a laminated E-shaped core 12 of an electromagnet on which is mounted in the usual manner a winding, coil or solenoid 13.

Cooperating with each core 12 and winding 13 is an armature 14 to which is rigidly connected a segmentally arcuate brake shoe 15 to the outer surface of which is fastened a brake lining 16 which is adapted to frictionally contact with the inner surface of the brake drum 6. Each armature is actuated to move its corresponding shoe into and out of engagement with said brake drum by springs and electromagnetic force respectively.

As shown, each armature has a longitudinal slot in which is pivotally connected by a pin 17, one arm 18 of a bell crank lever which is pivotally mounted at 19 in a bearing on the arm 8 of the bracket to swing in a radial plane of the drum that is parallel to the axis of rotation of the drum, the other arm 20 of said bell crank lever extending toward the axis of the casing 3 through a slot 21 in the arm 11 of the corresponding bracket. The free end of the arm 20 of the bell crank lever is bifurcated and straddles a rod 22 one end of which is rigidly connected to a spring tension adjusting plate 23 that has a swivel connection with a tubular adjusting screw 24 that is threaded in a cover 25 that closes a hole 26 in the face plate 4 which is provided for the insertion and removal of the spring actuating means for the brake shoe units. Surrounding each rod 22 and interposed between the plate 23 and the end of the corresponding bell crank arm 20 is a compression spring 27 which normally actuates the corresponding bell crank to move the corresponding brake-shoe into frictional contact with the brake drum 6.

Normally each brake shoe will be disengaged or retracted from the brake drum by energization of the electromagnets, but means is provided also for manually retracting the brake shoes from the brake drum, for example in emergencies or for testing the brake or in case the electromagnets become inoperative. This manually operated means is shown as comprising a brake-releasing disc 28 which is rigidly connected to the inner end of a brake releasing pull rod 29 which is slidable through the screw 24 and has its outer end pivotally connected at 30 to a hand lever 31 which is pivotally mounted at 32 on a bracket 33 secured to the cover 25. In the brake-releasing disc 28 is slidably mounted a sleeve 34 for each brake-shoe unit, which is slidable on the corresponding rod 22, each sleeve having a shoulder 35 at the end thereof adjacent the corresponding bell crank arm 20 between which and the disc 28 is interposed a spring 36. Said sleeve has another shoulder 37 at its other end to abut the disc 28 and prevent the sleeve from being pulled through the disc by the spring 36. With this construction, when the hand lever 31 is pulled outwardly, the brake releasing disc 28 is actuated to cause abutment of the end 35 of each sleeve 34 with the corresponding bell crank arm 20 so as to swing the latter and move the corresponding brake-shoe out of engagement with the brake drum against the influence of the spring 27. The springs 36 will equalize the effect of the movement of the hand lever upon the levers 18, 20 of the several brake shoes, and all of the brake shoes will be simultaneously manually disengaged from the brake drum. For returning the hand lever 31 and the brake release disc to their normal positions so as to permit the springs 27 to force their corresponding brake shoes into contact with the brake drum, I provide a compression spring 38 on the pull rod 29 and interposed between the end of the screw 24 and the brake release disc 28.

With this construction it will be seen that the springs 27, 38 and 36 will prevent all jarring and chattering of the bell cranks and brake lever. The manner of automatically electromagnetically disengaging the brake-shoes from the brake drum will be understood by those skilled in the art. The solenoids or windings 13 of the electromagnets are connected in circuit with a switch which is operated when the motor that carries the shaft is started so that said windings will be energized and cause attraction of the corresponding armatures 14. As the motor is shut off, said switch is operated to deenergize the windings 13 and thus permit the brake shoes to be simultaneously forced into engagement with the brake drum by the springs 27 so as to quickly but gradually slow down the rotation of the shaft 1.

During operation of the brake, the braking surface will wear, particularly the brake lining 15, and to adjust the parts for such wear, the brackets 8, 11 may be moved on the face plate 4 so as to vary the distance between the surface of the brake drum and the brake lining. To facilitate this adjustment, the arm 8 of each bracket has a lug 39 in which is screw threaded an adjusting screw 40 which has a spherical head 41 located in a hole 42 in the face plate and also has one or more sockets 43 to receive a pin wrench for rotating the screw. The screw is set into a recess 44 which opens through the inner side of the face plate 4 and the head of the screw bears against opposite sides of the hole 42 so that upon rotation of the screw in one direction or the other, the bracket 8, 11 will be moved in one direction or the other. During this operation the brake linings will be in contact with the brake drum and consequently said movement of the brackets will vary the width of the air gaps between the armatures and the cores 12 of the electromagnets. The width of these gaps determines the extent of movement of the surface of the brake lining with respect to the brake drum so that wear of the brake lining may be compensated by reducing the width of said gaps.

It is, of course, necessary that said gaps be identical in all of the brake shoe units, and to facilitate the adjustment I use a "feeler gauge" i. e. a thin strip of metal of a given thickness and insert it into the gap of each unit during the adjustment thereof. A hole 4a may be provided in the face plate A for each unit to permit the insertion of the feeler gauge into the gap, and preferably each hole will be closed normally by a plug or the like 4b to exclude dust within the casing.

For the purpose of holding each brake shoe against tilting or chattering during engagement thereof with the brake drum, a guide bar 51 is rigidly mounted on each bracket adjacent and beneath each end of the corresponding brake shoe and has a guide surface 52 parallel with the radial plane of said drum that bisects said brake shoe; and the metal plate 15 of each brake shoe is turned inwardly over and beneath itself and formed with a guide surface parallel to said plane and to the direction of movement of the corresponding brake shoe to slidably frictionally engage the surface 52 of the corresponding guide bar 51.

Should it be necessary to increase or decrease the torque developed by engagement of the brake shoes with the brake drum, this may be accomplished by rotating the screw 24, to increase or decrease the tension of the springs 27, until the desired torque is achieved. Preferably a lock nut 56 will be provided for holding the screw 24 in adjusted position. It will be noted that the springs 27 for all of the brake-shoe units are thus adjusted simultaneously.

With this construction as hereinbefore described it will be observed that the brake will be simple and compact in construction so as to occupy a minimum of space and will be substantially noiseless in operation without jarring or chattering of the parts.

It is desirable to provide means for cooling the braking surfaces and electromagnets, and for this purpose the web portion 53 of the brake drum 6 may have a plurality of fan blades 54 attached thereto and a plurality of openings 55 through said web and between said blades so that upon rotation of the shaft 1, air will be drawn through the casing 3 over the electromagnets. To facilitate flowing of air, the underside of the casing 3 may have an opening 56 normally covered by a dust excluding screen 57, and an arcuate partition 58 may be arranged in the casing in partially encircling relation to the brake drum to ensure that the air currents shall pass over the electromagnets and braking surfaces and through the holes in the web of the drum instead of around the exterior of the drum.

While I have shown and described the invention as embodied in certain details of construction, it will be understood that this is primarily for illustrating the principles of the invention and that many modifications and changes may be made in the details of construction of the brake within the spirit and scope of the invention. For example, if desired the brake-shoes and operating mechanism therefor may be arranged so that the brake-shoes will engage the exterior of the brake-drum instead of the interior, as shown.

What I claim is:

1. An electromagnetic brake comprising a brake drum, a stationary support, a plurality of separate brake-shoe units spaced circumferentially of said brake drum to cooperate therewith, each including a bracket mounted on said support, an electromagnetic coil mounted on said bracket, an armature for said coil, a brake-shoe connected to said armature, a lever, means pivotally mounting said lever on said bracket to enable said lever to swing in a radial plane of the drum that is parallel to the axis of the drum, and means connecting said lever to said armature to movably mount the latter for actuation of said brake-shoe radially of said drum into and out of engagement with said brake drum.

2. The electromagnetic brake set forth in claim 1 with the addition of spring means normally actuating each of said levers in one direction.

3. The electromagnetic brake set forth in claim 1 with the addition of a spring mechanism for each of said units to actuate the corresponding lever in the direction to engage the corresponding brake-shoe with said brake drum.

4. The electromagnetic brake set forth in claim 1 wherein each bracket is mounted on said support to move radially with respect to said brake-drum to adjust the corresponding brake-shoe relatively to said brake-drum.

5. The electromagnetic brake set forth in claim 1 wherein each said lever is a bell crank and has one arm pivotally connected to the corresponding armature and the other arm swingable in a longitudinal radial plane of said drum, and with the addition of spring mechanism normally engaging the second-mentioned arm of each said bell crank lever to actuate the corresponding brake-shoe in one direction.

6. The electromagnetic brake set forth in claim 1 with the addition of a spring mechanism for each of said units to actuate the corresponding lever in the direction to engage the corresponding brake-shoe with said brake drum, and mechanism including a hand lever and means connecting said hand lever to all of said levers for simultaneously disengaging said brake-shoes from said drum.

7. The electromagnetic brake set forth in claim 1 with the addition of a spring mechanism for each of said units to actuate the corresponding lever in the direction to engage the corresponding brake-shoe with said brake drum, and means for simultaneously adjusting all of said spring mechanisms to vary the torque developed by engagement of said brake-shoes with said brake-drum.

8. The electromagnetic brake shoe set forth in claim 1 wherein each said lever is a bell crank and has one arm pivotally connected to the corresponding armature, and with the addition of spring mechanism normally engaging the other arm of said bell crank lever to actuate the corresponding brake-shoe in one direction, and means for simultaneously adjusting all of said spring mechanisms to vary the torque developed by engagement of said brake shoes with said brake-drum.

9. The electromagnetic brake set forth in claim 1 wherein each said lever is a bell crank and has one arm pivotally connected to the corresponding armature and the other arm extending radially with respect to the axial line of said drum, and spring mechanism including an adjusting plate mounted on said support for movement longitudinally of said axial line, springs, one interposed between each of the second-mentioned arms of said bell cranks and said plate, and means for moving said plate to adjust simultaneously the tension of all of said springs.

10. The electromagnetic brake set forth in claim 1 with the addition of a core for each coil and wherein said core and said armature have juxtaposed flat surfaces which contact each other when said electromagnet is energized so that said armature will seat directly and firmly on said core under influence of electromagnetic force to prevent wobbling of said armature.

11. The electromagnetic brake set forth in claim 1 with the addition of means for positively guiding said brake-shoes to prevent tilting and chattering thereof in their movement into and out of engagement with said brake drum, said means including a guide bar rigidly mounted on each bracket adjacent and beneath each end of the corresponding brake-shoe and having a guide surface parallel with the radial plane of said drum that bisects said brake-shoe and a guide surface on and adjacent each end of said shoe frictionally slidably engaging said guide bar.

12. The electromagnetic brake set forth in claim 1 wherein each brake-shoe includes a piece of metal plate having each end portion turned inwardly of and beneath itself and formed with a guide surface parallel to the direction of movement of said brake-shoe, and with the addition of a guide bar rigidly connected to each bracket adjacent each said end of the corresponding brake-shoe and formed with a guide surface parallel to and frictionally contacted by one of said guide surfaces on said brake-shoe, whereby said brake-shoes are positively guided to prevent tilting and chattering thereof in their movements into and out of engagement with said brake drum.

13. The brake set forth in claim 1 with the addition of means for positively guiding said brake-shoes to prevent tilting and chattering thereof in their movement into and out of engagement with said brake drum, said means including a guide bar rigidly mounted on each bracket adjacent and beneath each end of the corresponding brake-shoe, and having a guide surface parallel with the radial plane of said drum that bisects said brake-shoe and a guide surface on and adjacent each end of said shoe frictionally slidably engaging said guide bar.

14. The electromagnetic brake set forth in claim 1 wherein each bracket is mounted on said support to move radially with respect to said brake-drum to adjust the corresponding brake-shoe relatively to said brake-drum and with the addition of a screw threaded in said bracket and in said support for moving said bracket to make such adjustment.

15. The electromagnetic brake set forth in claim 1 wherein each bracket is mounted on said support to move radially with respect to said brake-drum to adjust the corresponding brake-shoe relatively to said brake-drum and with the addition of a screw threaded in said bracket and mounted in said support for moving said bracket to make such adjustment, and means for clamping said bracket in adjusted positions.

16. An electromagnetic brake comprising a brake drum, a stationary support, a plurality of separate brake-shoe units spaced circumferentially of said brake drum to cooperate therewith, each unit including a bracket mounted on said support, an electromagnet comprising a coil and an armature one of which is mounted on said bracket while the other is movable radially of said drum, a brake shoe rigidly connected to and movable with the movable one of said coil and armature, and means movably mounted on said bracket and connected to said movable one of said coil and armature to mount and move the brake-shoe radially of said drum into and out of engagement with said drum, movement of said means and the corresponding brake-shoe of each unit being independent of and unaffected by movement of said means and the brake-shoes of all other units.

17. The electromagnetic brake set forth in claim 16 with the addition of means for positively guiding said brake-shoes to prevent tilting and chattering thereof in their movement into and out of engagement with said brake drum.

18. The electromagnetic brake as defined in claim 16, wherein each bracket is mounted on said support to move radially with respect to said brake-drum to adjust the corresponding brake-shoe relatively to said brake-drum.

19. The electromagnetic brake as defined in claim 16 with the addition of a spring mechanism for each of said units to actuate the corresponding means in the direction to engage the corresponding brake-shoe with said brake drum, and mechanism including a hand lever for actuating all of said means simultaneously to disengage said brake-shoes from said drum.

20. The electromagnetic brake as defined in claim 16 with the addition of a core for each coil and wherein said core and said armature have juxtaposed flat surfaces which contact each other when said electromagnet is energized so that said armature will seat directly and firmly on said core under influence of electromagnetic force to prevent wobbling of said movable one of said coil and armature.

21. For use in an electromagnetic brake comprising a brake drum, a bracket to be mounted on a stationary support to cooperate with a brake drum, an electromagnetic coil mounted on said bracket, an armature having a brake shoe integral therewith, whereby upon energization of said coil, said armature and said brake shoe will be moved by magnetic force in one direction, a bell crank lever pivotally mounted on said bracket and having one arm pivotally connected to said armature and so disposed as to be approximately parallel to the axis of said drum and the other arm to extend laterally of the drum toward the axis thereof and formed for connection to means for swinging said lever to move said armature and brake-shoe in the other direction.

EMIL E. HOLLANDER.

REFERENCES CITED

The following references are of record in the file of this patent:

UNITED STATES PATENTS

| Number | Name | Date |
|---|---|---|
| 1,407,207 | McAuly | Feb. 21, 1922 |
| 1,688,379 | Dodd | Oct. 23, 1928 |
| 1,847,319 | Wentworth | Mar. 1, 1932 |
| 1,929,914 | Coberly et al. | Oct. 10, 1933 |
| 1,966,169 | Forbes | July 10, 1934 |
| 2,052,201 | Logan et al. | Aug. 25, 1936 |
| 2,059,244 | Kiekhaefer | Nov. 3, 1936 |
| 2,232,710 | Lum | Feb. 25, 1941 |
| 2,262,352 | Arnold | Nov. 11, 1941 |
| 2,385,459 | Nelson et al. | Sept. 25, 1945 |

FOREIGN PATENTS

| Number | Country | Date |
|---|---|---|
| 268,104 | Germany | Dec. 8, 1913 |
| 510,966 | Germany | Oct. 24, 1930 |